United States Patent [19]
Kaihara et al.

[11] Patent Number: 5,652,920
[45] Date of Patent: Jul. 29, 1997

[54] CAMERA WITH POP-UP FLASH HAVING ILLUMINATION ANGLE VARIABLE WITH FOCAL LENGTH

[75] Inventors: Shoji Kaihara; Hidehiko Fukahori; Tsuyoshi Fukuda, all of Kanagawa-ken, Japan

[73] Assignee: Canon Kabushiki Kaisha, Tokyo, Japan

[21] Appl. No.: 593,268

[22] Filed: Jan. 29, 1996

Related U.S. Application Data

[60] Continuation of Ser. No. 284,192, Aug. 2, 1994, abandoned, which is a division of Ser. No. 882,904, May 14, 1992, Pat. No. 5,363,162.

[30] Foreign Application Priority Data

| | | | |
|---|---|---|---|
| May 17, 1991 | [JP] | Japan | 3-113004 |
| Jul. 18, 1991 | [JP] | Japan | 3-178229 |

[51] Int. Cl.⁶ .................................................. G03B 15/05
[52] U.S. Cl. ............................ 396/62; 396/175; 396/177
[58] Field of Search .......................... 354/126, 149.1, 354/149.11; 396/61, 62, 175, 176, 177, 358

[56] References Cited

U.S. PATENT DOCUMENTS

| | | |
|---|---|---|
| 4,970,539 | 11/1990 | Sasagaki et al. ........................ 396/175 |
| 4,982,210 | 1/1991 | Shimada et al. ........................ 396/175 |
| 5,012,269 | 4/1991 | Tosaka et al. ........................ 396/177 |
| 5,055,866 | 10/1991 | Takebayashi ........................ 396/175 |
| 5,070,349 | 12/1991 | Haraguchi et al. ........................ 396/358 |
| 5,079,574 | 1/1992 | Ueno ........................ 396/177 |

FOREIGN PATENT DOCUMENTS 1-157328  10/1989  Japan .

*Primary Examiner*—Safet Metjahic
*Assistant Examiner*—J. K. Han
*Attorney, Agent, or Firm*—Fitzpatrick, Cella, Harper & Scinto

[57] ABSTRACT

A camera including a camera body and flash unit, in which the camera includes a drive source in the camera body, a moving mechanism for causing the flash unit to move from a non-projected position to a projected position, an illumination-angle switching mechanism for varying an illumination angle of the flash unit, the illumination-angle switching mechanism being driven by a force of the drive force in one direction and being capable of stopping in any one of a plurality of specific illumination angle states, a focal length detecting device, and a controlling device that causes the illumination-angle switching mechanism to selectively switch one illumination angle to another in accordance with the focal length detected by the focal length detecting device, in response to the operation of the moving mechanism to move the flash unit from a non-projected position to a projected position.

13 Claims, 11 Drawing Sheets

DRIVING OF MIRROR AND SHUTTER

CAMERA WITH POP-UP FLASH HAVING ILLUMINATION ANGLE VARIABLE WITH FOCAL LENGTH

This application is a continuation of application Ser. No. 08/284,192, filed Aug. 2, 1994, now abandoned, which is a divisional of application Ser. No. 07/882,904, filed May 14, 1992, now U.S. Pat. No. 5,363,162.

BACKGROUND OF THE INVENTION

1. Field of the Invention

The present invention relates to a camera which includes as a built-in unit, or which is removably attachable, a flash unit having an illumination-angle varying mechanism.

2. Description of the Related Art

A camera which includes a built-in flash unit having a flash zooming mechanism has conventionally been proposed.

For example, Japanese Laid-Open Utility Model Application No. Hei 1-157328 proposes a camera which is provided with a turnable flash unit including a flash zooming mechanism and a drive motor therefor.

This arrangement, however, has a number of disadvantages. For example, since it is necessary to incorporate an exclusive motor for driving the flash zooming mechanism in the flash unit, the cost of the flash unit increases and the size of the flash unit itself increases. In the case of a structure in which the flash unit having the above-described construction is disposed for turning motion between a projected position and a non-projected position, it is impossible to move the flash unit sufficiently rapidly because of its heavy weight. Therefore, it is difficult to cause the flash unit to flash at an accurate time.

Portability is an important consideration in the design of recent flash units, whether of the types built in cameras or externally attachable to cameras. To meet portability, one type of flash unit is designed so that the flash unit is in a pop-down state during normal photographic operation and only when flashing is needed, is it popped up. However, in such a flash unit, during photography, since it is necessary to vary an illumination angle in accordance with the focal length of an attached photographic lens after the pop-up operation of the flash unit has been completed, a so-called release time lag increases and a shutter opportunity may be missed.

SUMMARY OF THE INVENTION

It is, therefore, an object of the present invention to provide a camera which is reduced in size and weight by utilizing an arrangement in which not only the driving of an illumination-angle varying mechanism in a flash unit but also a pop-up operation of the flash unit is carried out by means of a rotation in one direction of a motor provided for driving a camera operation mechanism within a camera body, as well as in which both mechanisms are arranged to operate in phase.

It is another object of the present invention to provide a camera which makes it possible to prevent a photographer from missing a shutter opportunity by starting an illumination-angle varying operation at the same time as the start of a pop-up operation of a flash unit and varying an illumination angle in accordance with the focal length of a photographic lens.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below with reference to FIGS. 1 through 12.

Figure 1:
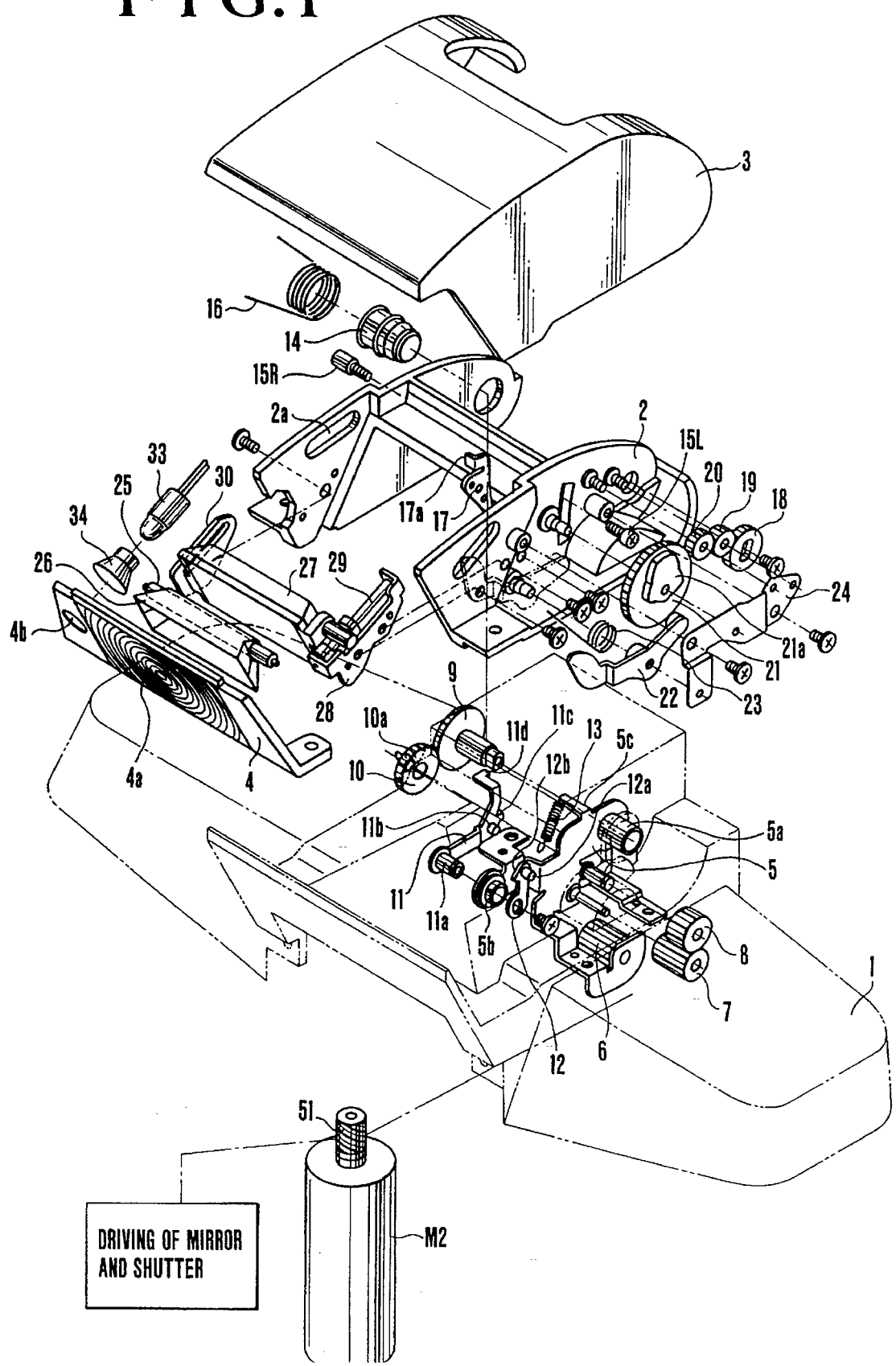
FIG. 1 is an exploded, perspective view diagrammatically showing a flash unit part and associated elements in a camera according to the present invention.
Figure 2:
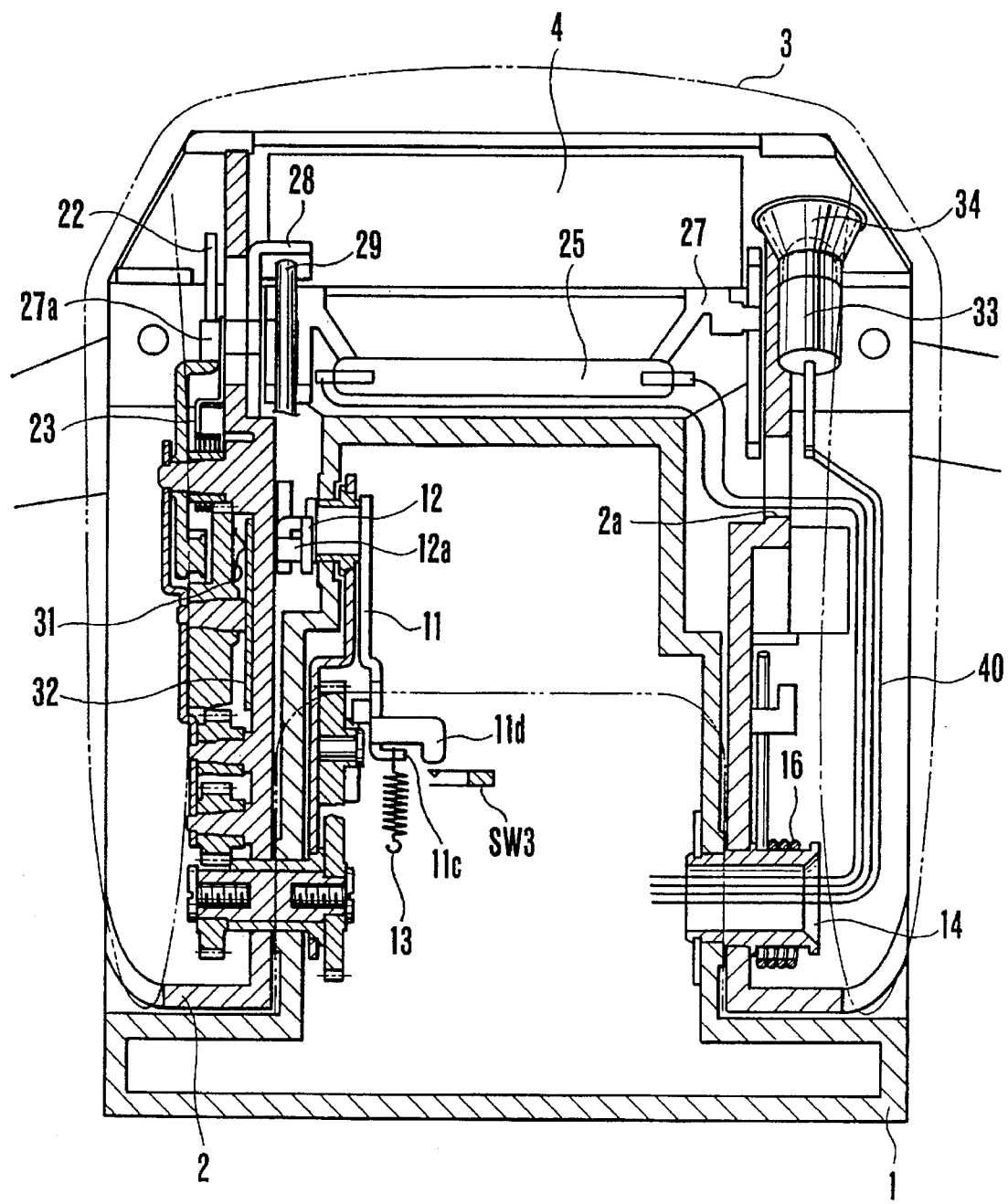
FIG. 2 is a cross-sectional view showing the structure of part of the flash unit part of FIG. 1 as viewed from the top side of the camera.

Referring first to FIGS. 1 and 2, a top cover 1 serves as an exterior member which constitutes part of a camera body. A case 2 is supported rotatably with respect to the top cover 1, and constitutes the skeleton of a flash unit. A slot 2a plays the role of routing a lead wire 40, to be described later, by allowing it to pass therethrough, and of absorbing the movement of members caused by a flash zooming operation. A flash cover 3 defines the external appearance of the flash unit, and is fixed to the case 2. A panel 4 covers the entire front face of the flash unit, and has a Fresnel lens portion 4a for controlling flash light and a window portion 4b which opposes a red-eye preventing lamp which will be described later. A base plate 5 has a plurality of gear shafts, a bearing 5a having an outer circumference which serves as a rotating shaft for the case 2, a bearing 5b, and a spring hook 5c. The base plate 5 is fixed to the top cover 1 on the reverse side thereof by screws.

A motor M2 is fixed to the camera body or to a mirror box, and a gear 6 is meshed with a gear train which is coupled to the motor M and which includes a planetary clutch mechanism to be described later. Rotation in one direction only is transmitted to the gear 6 from the motor M2 through the gear train. The rotation of the gear 6 is rotationally transmitted to a gear 8 through a gear 7.

A gear 9 is meshed with the gear 8, and is rotatably fitted into the inner circumference of the bearing 5a of the base plate 5. A gear 10 is meshed with the gear 9, and has one side provided with a blade assembly 10a consisting of three blades which are arranged at equally spaced circumferential intervals as shown in each of FIGS. 5(A), 5(B) and 5(C). A lever 11 has a shaft portion 11a, a projection 11b, a spring hook 11c, and a switch pressing portion 11d. The shaft portion 11a is supported for rotation with respect to the inner circumference of the bearing 5b. The switch pressing portion 11d turns on a switch SW3 (refer to FIGS. 2 and 7) when the lever 11 moves for a pop-up operation. A retaining lever 12 has a claw 12b as well as a projection 12a in the vicinity of the claw 12b, and is fixed to the shaft portion 11a of the lever 11. A spring 13 is hooked on the spring hook 5c of the base plate 5 at one end and on the spring hook 11c of the lever 11 at the other end. The spring 13 urges the retaining lever 12 counterclockwise, i.e., so that the claw 12b rotates in its engagement direction. A bearing 14 is, in part, fixed to the top cover 1 and, in part, serves as a rotating shaft for the case 2.

Screws 15L and 15R serve as stoppers when the case 2 rotates in the direction in which it projects from the top cover 1, and are fastened to the top cover 1. A spring 16 urges the case 2 in the pop-up direction, and is fitted onto a portion of the outer circumference of the bearing 14 with one arm hooked on the screw 15R and the other arm on the case 2. A fixed engagement member 17 has a hook 17a on which the claw 12b of the retaining lever 12 is hooked. As shown in more detail in FIGS. 6(A) and 6(B), the fixed engagement member 17 has cam portions 17b and 17c, and the cam portion 17c has an arc concentric to the rotational axis of the case 2. The fixed engagement member 17 is fixed to the case 2.

Figure 5A:
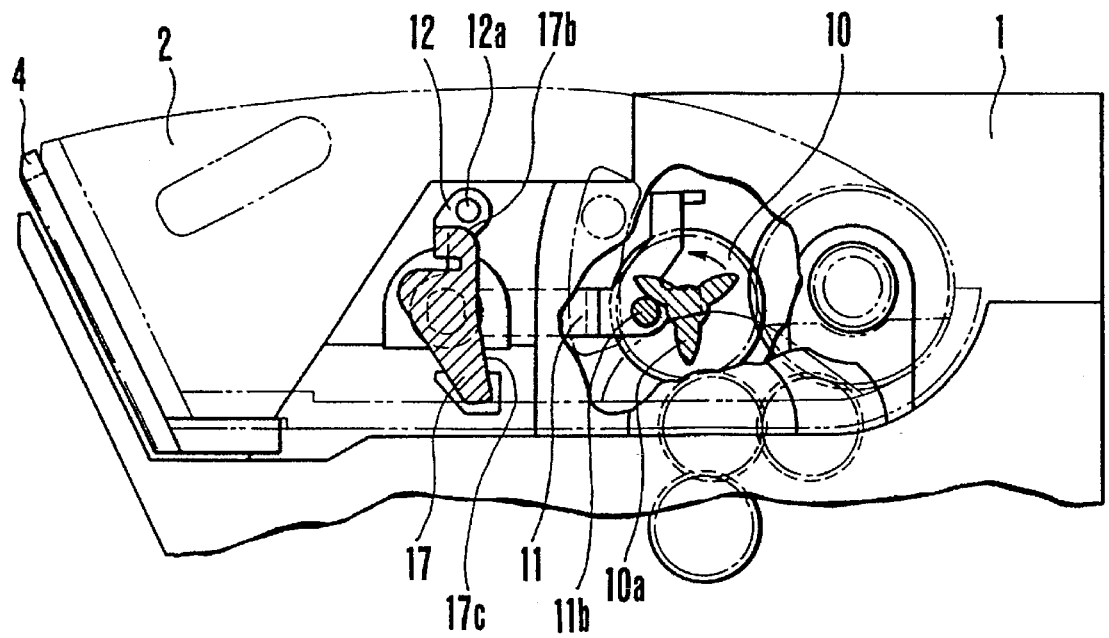
FIGS. 5(A), 5(B) and 5(C) are schematic views illustrating the operation of the pop-up moving mechanism of the flash unit.
Figure 5B:
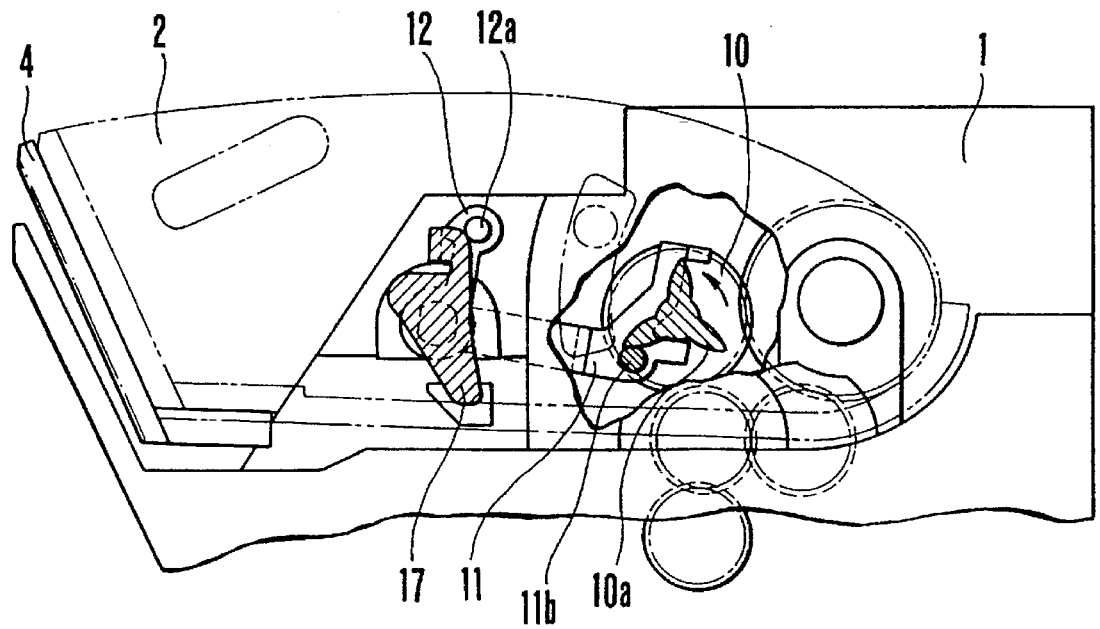
Figure 5C:
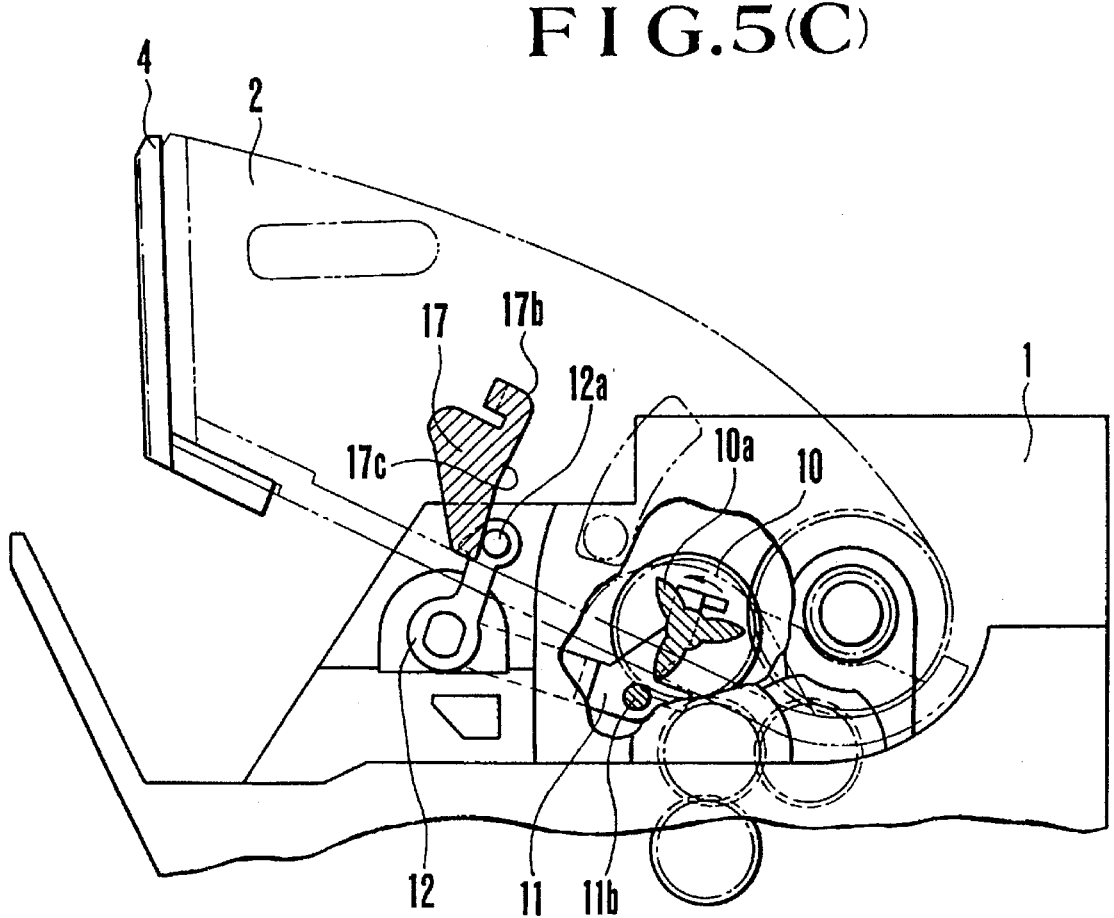
Figure 6A:
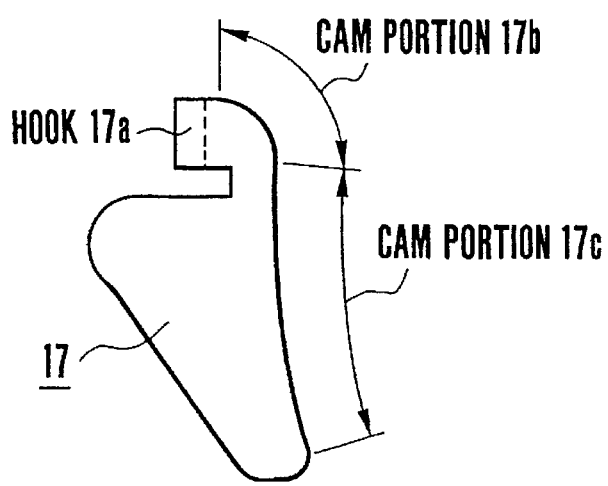
FIGS. 6(A) and 6(B) are views showing a fixed engagement mechanism member for holding the flash unit by engagement.
Figure 6B:
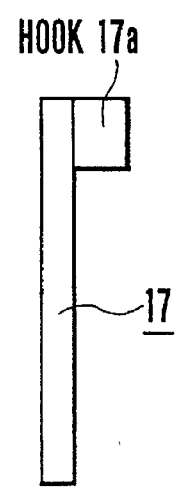

As shown in FIGS. 5(A) to 5(C), when the motor M2 is activated, the rotation of the motor M2 is transmitted to the gear 10 through the gears 6 to 9 and the blade assembly 10a of the gear 10 presses down the projection 11b of the lever 11 against the spring 13. Then, the retaining lever 12 is made to rotate in a clockwise direction which is the same as the direction of movement of the lever 11, and the claw 12b of the retaining lever 12 is released from the hook 17a of the fixed engagement member 17. The case 2 starts to turn in the projecting direction by the urging of the spring 16, thus bringing the projection 12a into abutment with the cam portion 17b of the fixed engagement member 17.

The case 2 turns further, and as it turns by the force of the spring 16, the case 2 presses the projection 12a of the retaining lever 12 through the cam portions 17b to 17c of the fixed retaining member 17. Thus, the retaining lever 12 is made to turn in the region of the cam portion 17c until the projection 11b of the lever 11 moves away from the rotating area of the blade assembly 10a of the gear 10 (refer to FIGS. 5(B) and 5(C)). In other words, the retaining lever 12 is released by the blade assembly 10a and the case 2 starts its upward movement. The retaining lever 12 is made to escape to a further extent by the upward movement of the case 2, and the projection 11b of the lever 11 is made to turn outward of the rotating area of the blade assembly 10a so that no further rotation of the motor M2 is transmitted to either of the lever 11 and the retaining lever 12. The case 2 further turns in the projecting direction until it comes into abutment with the screws 15L and 15R, with a constant frictional force produced between the projection 12a and the arcuate part of the cam portion 17c by the urging force of the spring 13 (refer to FIGS. 5(A) to 5(C)).

Figure 9:
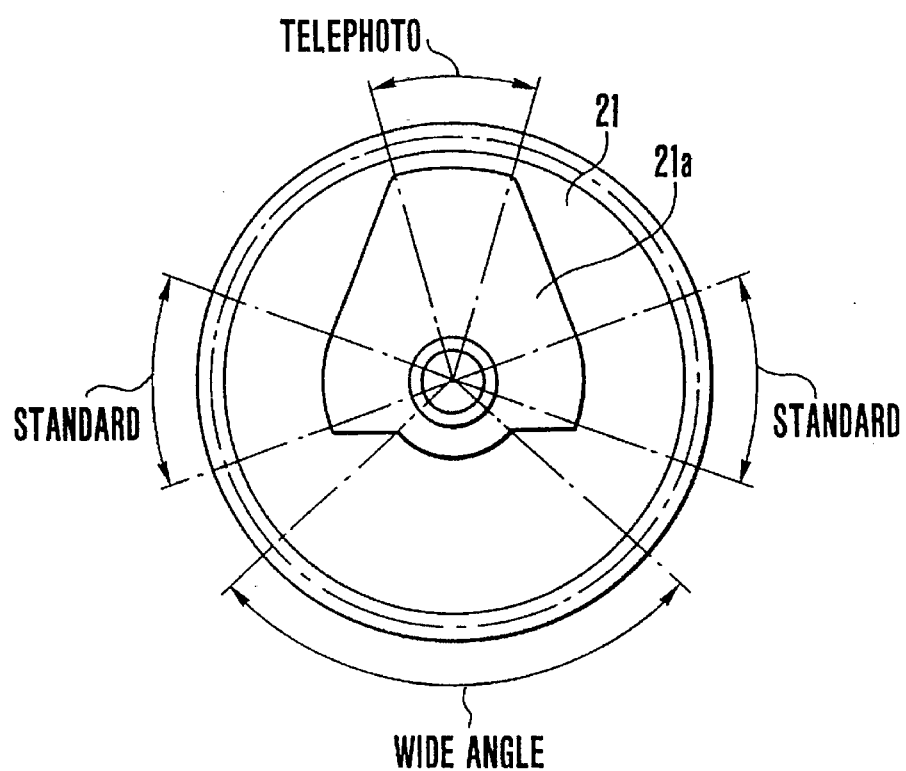
FIG. 9 is a schematic view showing a cam which constitutes part of a flash zooming mechanism in the structure shown in FIG. 4.

A gear 18 is fixed coaxially to the gear 9 positioned within the top cover 1 and transmits a driving power to a mechanism inside of the case 2. Idlers 19 and 20 transmit the rotation of the gear 18 to a gear 21. The gear 21 has a cam 21a on one face and a contact piece 31 (refer to FIG. 2) fixed to the other face. As shown in FIG. 9, the cam 21a has four cam phases which are defined by a wide-angle portion, a telephoto portion and two standard portions, respectively.

Figure 10:
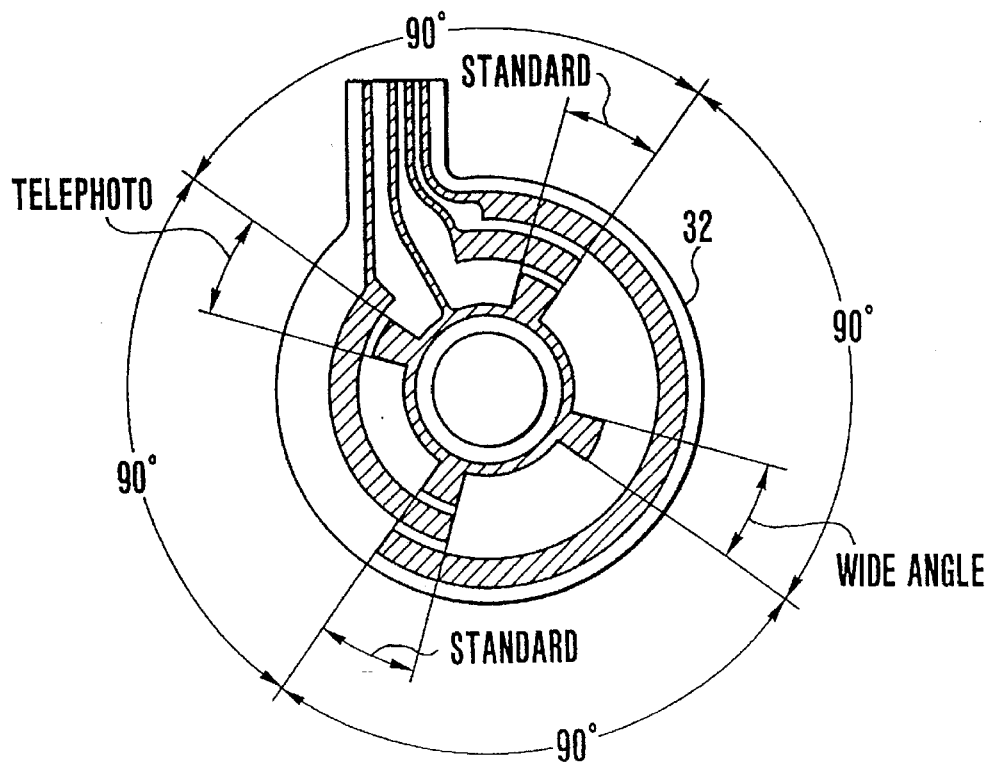
FIG. 10 is an enlarged front elevational view showing a conductor pattern board which constitutes part of rotational-position detecting means provided in the power transmission mechanism of the flash unit.

The contact piece 31 is in slidable contact with a printed board 32 (refer to FIGS. 2 and 10). As shown in FIG. 10, the printed board 32 is provided with brake-phase portions which are arranged at equally spaced intervals 90° apart so that they appear in the order of standard→telephoto→standard→wide angle→standard→ . .., as shown in FIG. 10. The turning phase of a transmission lever 22 having a roller 22a for detecting the phase of the cam 21a is detected through the printed board 32 having such brake phases (the roller 22a will be described later). The aforesaid gears 19 to 21 are supported for rotation about associated shafts on the case 2. The transmission lever 22 has a bearing which is rotatably fitted onto an associated shaft on the case 2, the roller 22a for tracing the motion of the cam 21a, and a pressure part 22b for pressing a holder 27 (refer to FIG. 3(A)). A spring 23 is fitted onto the outer circumference of the bearing of the transmission lever 22 with one end hooked on the case 2 and the other end, on the holder 27 which will be described later. A pressure plate 24 is fastened to the case 2 by screws in the state of securing the gears 19 to 21 and the transmission lever 22 in position.

Figure 11A:
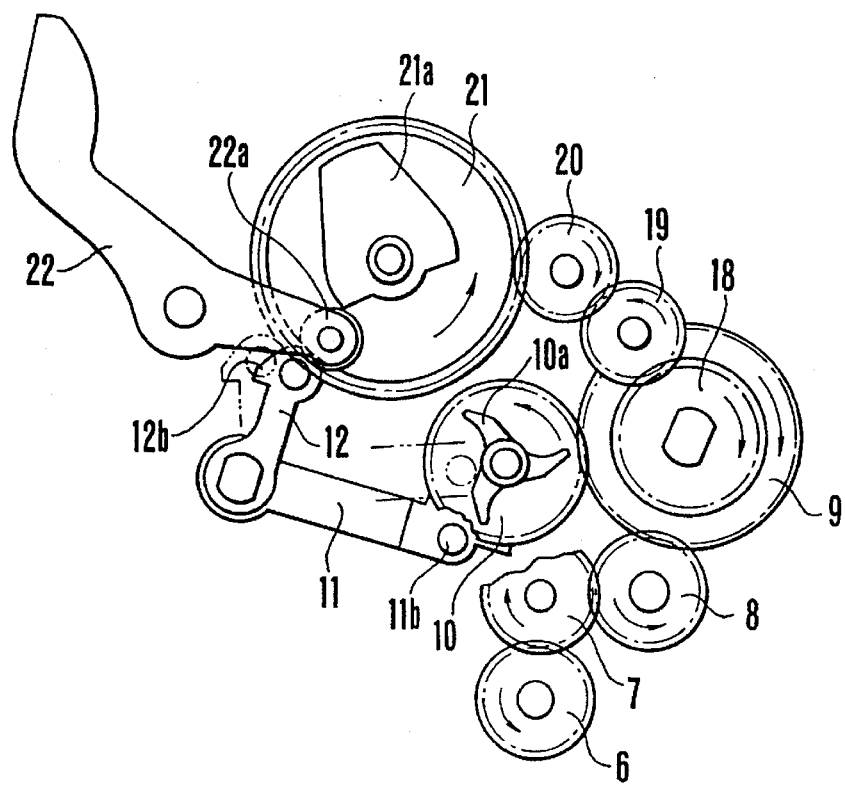
FIGS. 11(A) and 11(B) are schematic views showing the state of operation of the power transmission mechanism of the flash unit.
Figure 11B:
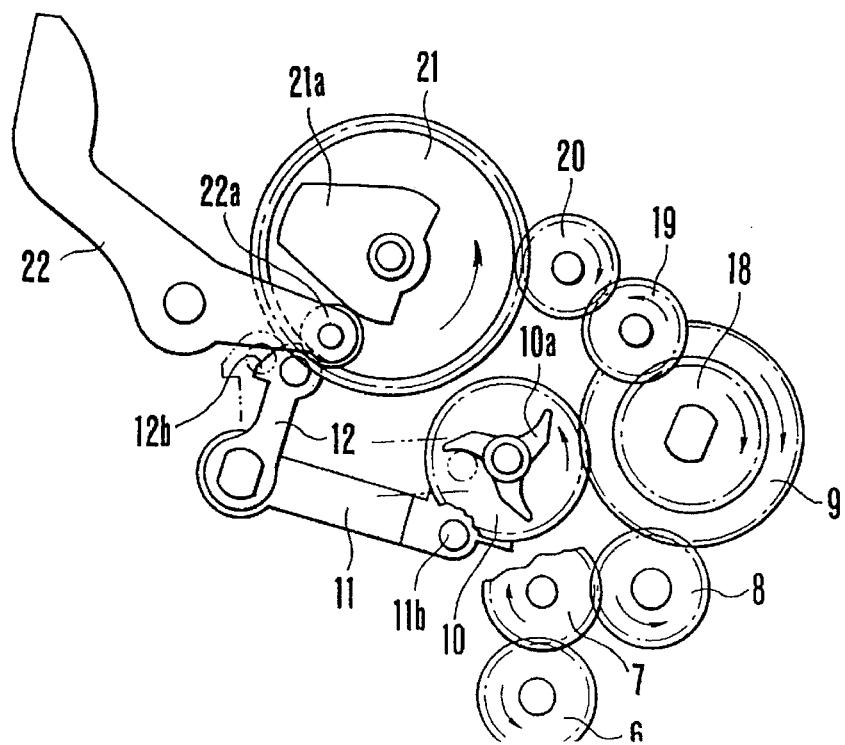

FIG. 11(A) shows the state in which each of the blade assembly 10a and the associated elements is placed at the start of a flash-zooming braking operation when a standard illumination angle is selected. FIG. 11(B) shows the state in which each of the blade assembly 10a and the associated elements is placed when the gear 10 stops after an overrun.

The gear 21 having the cam 21a and the gear 10 having the blade assembly 10a are coupled to each other at a specific gear ratio through the gears 9 and the gears 18 to 20. In the embodiment, the gear ratio is selected so that the gear 10 makes a ⅔ rotation for each ¼ rotation of the gear 21. Specifically, in accordance with the brake pattern formed on the printed board 32, each time the gear 21 rotates through 90° degrees (¼ rotation), the rotation of the gear 21 enters its brake phase and the blade assembly 10a of the gear 10 assumes the state shown in FIG. 11(A). Subsequently, the gear 10 overruns until the blade assembly 10a reaches its maximum allowable position as shown in FIG. 11(B). The gear ratio is, therefore, selected so that the overrun of the blade assembly 10a can be stopped between the state of FIG. 11(A) and the state of FIG. 11(B), whatever change may occur in operational conditions which are determined by factors such as the motor M2, a power supply or temperature conditions.

For example, if it is assumed that each brake-phase portion formed as a brake pattern on the printed board 32 has an angular extent of 15°, the gear 10 stops after an overrun of about 40°. Whichever of the standard, telephoto and wide-angle illumination angles is selected, the blade assembly 10a of the gear 10 can stop within a similar phase.

As is apparent from the above description, even if the flash unit, which is in a pop-up state, is pressed down with any of the standard, telephoto, and wide-angle illumination angles being selected, the projection 11b of the lever 11 does not interfere with the blade assembly 10a of the gear 10. Accordingly, the claw 12b of the retaining lever 12 is hooked on the hook 17a of the fixed engagement member 17 and the flash unit is secured in a retracted state.

In the above-described embodiment, the cam 21a of the gear 21 has four cam phases, the blade assembly 10a of the gear 10 has three blades, and the gear ratio is selected so that the gear 10 makes an 8/3 rotation for a rotation of the gear 21. However, the gear ratio may be an integral multiple of ¾, or the cam 21a of the gear 21 may have three cam phases and the gear ratio may be selected to be an integral multiple of ⅓. For example, the cam phase of the gear 21 is made coincident with the rotational phase of the blade assembly 10a of the gear 10, and the number of stop positions of the gear 21 and the number of blades of the blade assembly 10a of the gear 10 as well as the gear ratio may be selected so that the blade assembly 10a of the gear 10 can assume a similar phase whichever of the stop positions the gear 21 may take.

Figure 3A:
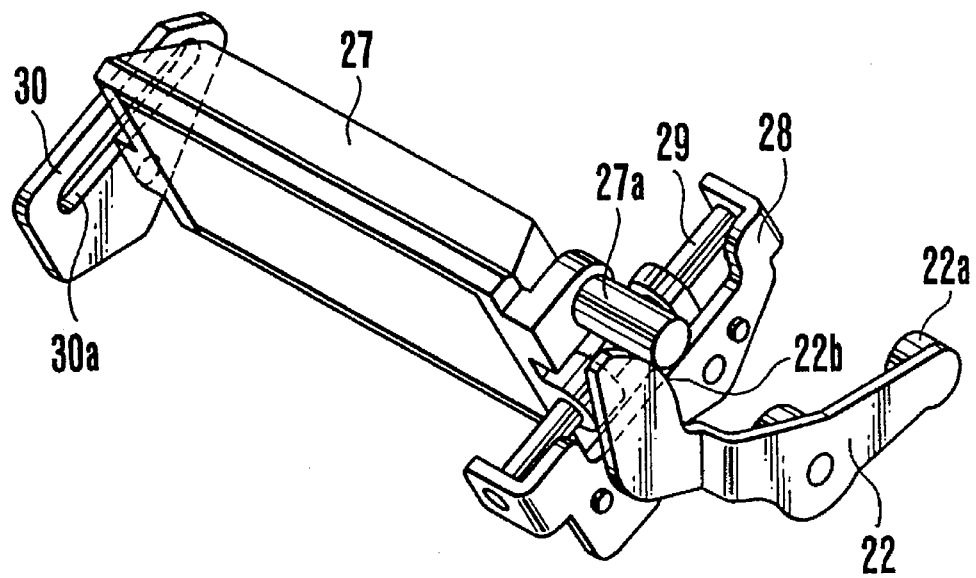
FIGS. 3(A) and 3(B) are diagrammatic perspective views showing a holder in the structure shown in FIG. 1.
Figure 3B:
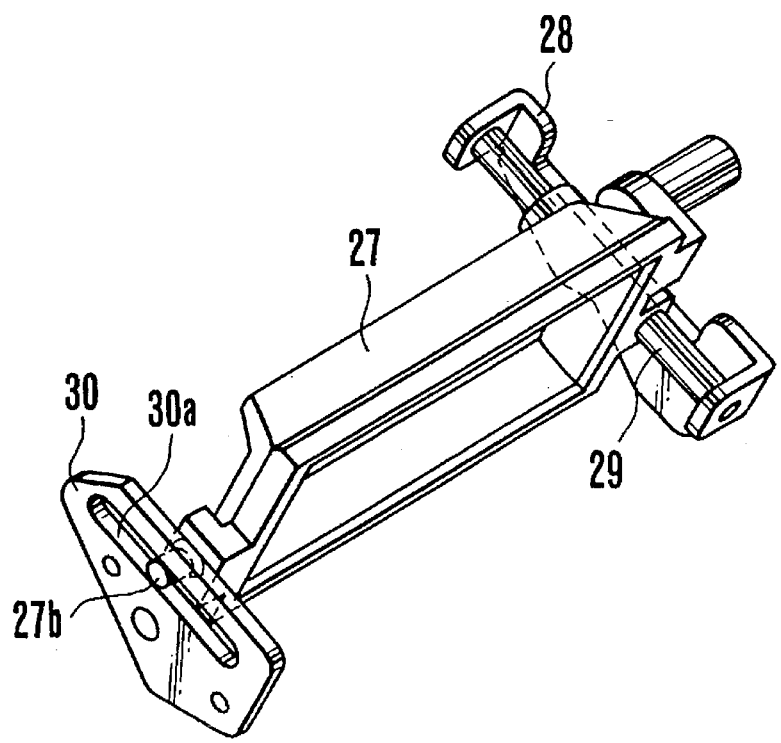

A xenon tube 25 is fixed to a reflector 26 by rubber, which is not shown. The holder 27 holds the xenon tube 25 and the reflector 26. A holding member 28 is fixed in the inside of the case 2. A shaft 29 is held by the holding member 28 and is positioned to extend in a direction perpendicular to the plane of the panel 4. A rail member 30 has a rail-shaped slot 30a which extends in the same plane as the shaft 29, and is fixed in the inside of the case 2. As shown in FIGS. 3(A) and 3(B), one end of the holder 27 is supported for sliding movement along the axis of the shaft 29, and the other end has a boss 27b, which is supported for sliding movement along the slot 30a in the rail member 30. One end of the spring 23 is hooked on a projection 27a of the holder 27, and the holder 27 is urged toward the panel 4 by the spring 23 and is subjected to a restricting force acting in an opposite direction by the transmission lever 22.

More specifically, as shown in FIGS. 3(A), 3(B) and 11(A), 11(B), the transmission lever 22 is made to swing on the basis of the cam displacement of the cam 21a of the gear 21 to which the rotation of the motor M2 is transmitted. A pushing portion 22b pushes the projection 27a of the holder 27 against the spring 23, thereby causing a flash part made up of the reflector 26 and the xenon tube 25 held by the holder 27 to move back and fourth in opposite directions perpendicular to the plane of the panel 4.

Referring back to FIGS. 1 and 2, a red-eye preventing lamp 33 and a reflector 34 for intensifying the light from the red-eye preventing lamp 33 by reflection are fixed on the reverse side of a window 4b of the panel 4. As shown in FIG. 2, the case 2 is divided into three sections: the flash part made up of the movable members 25 to 27 is laid out in the middle section; a mechanism part including the elements 18 to 24 for driving the flash part, in the left-hand side section; and a unit made up of the red-eye preventing lamp 33 and the reflector 34, in the right-hand side section. A bundle of lead wires 40 extends through the bearing 14 into the right-hand side section of the case 2, and some of the lead wires 40 are connected to the lamp 33 with the other connected to the xenon tube 25 through the slot 2a.

Figure 4:
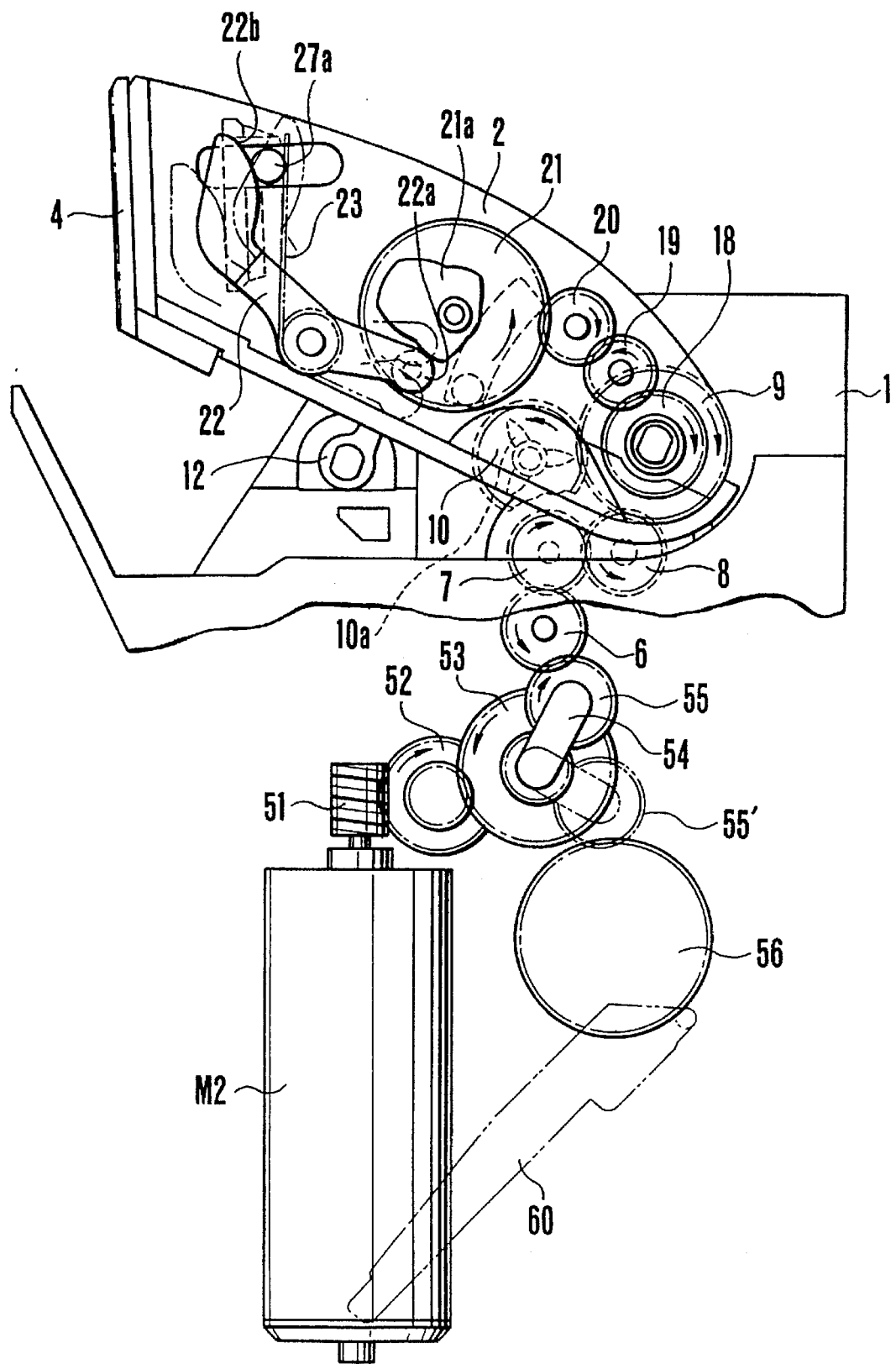
FIG. 4 is a schematic view showing a power transmission system for transmitting a driving power to a flash zooming mechanism in the flash unit.

A planetary clutch mechanism for transmission of the output of the motor M2 will be described below with reference to FIG. 4. The output of the motor M2 is transmitted to a sun gear 53 through a gear train consisting of a gear 51 and a transmission gear 52. A planetary lever 54 is frictionally coupled to the central shaft of the sun gear 53, and a planetary gear 55 is rotatably supported by the planetary lever 54. Thus, the sun gear 53, the planetary lever 54 and the planetary gear 55 constitute the planetary clutch mechanism.

Although a detailed illustration is omitted, a mirror driving gear 56 is provided. As the mirror driving gear 56 rotates in one direction, a main mirror 60 performs the motion of moving from an observation-enable position (down position) to an exposure-enable withdrawal position (up position) and returning from the exposure-enable withdrawal position to the observation-enable position.

When the motor M2 is reversed, the sun gear 53 rotates in the counterclockwise direction to mesh the planetary gear 55 with the gear 6. When the motor M2 is forwarded, the planetary gear 55 meshes with the mirror driving gear 56.

Figure 7:
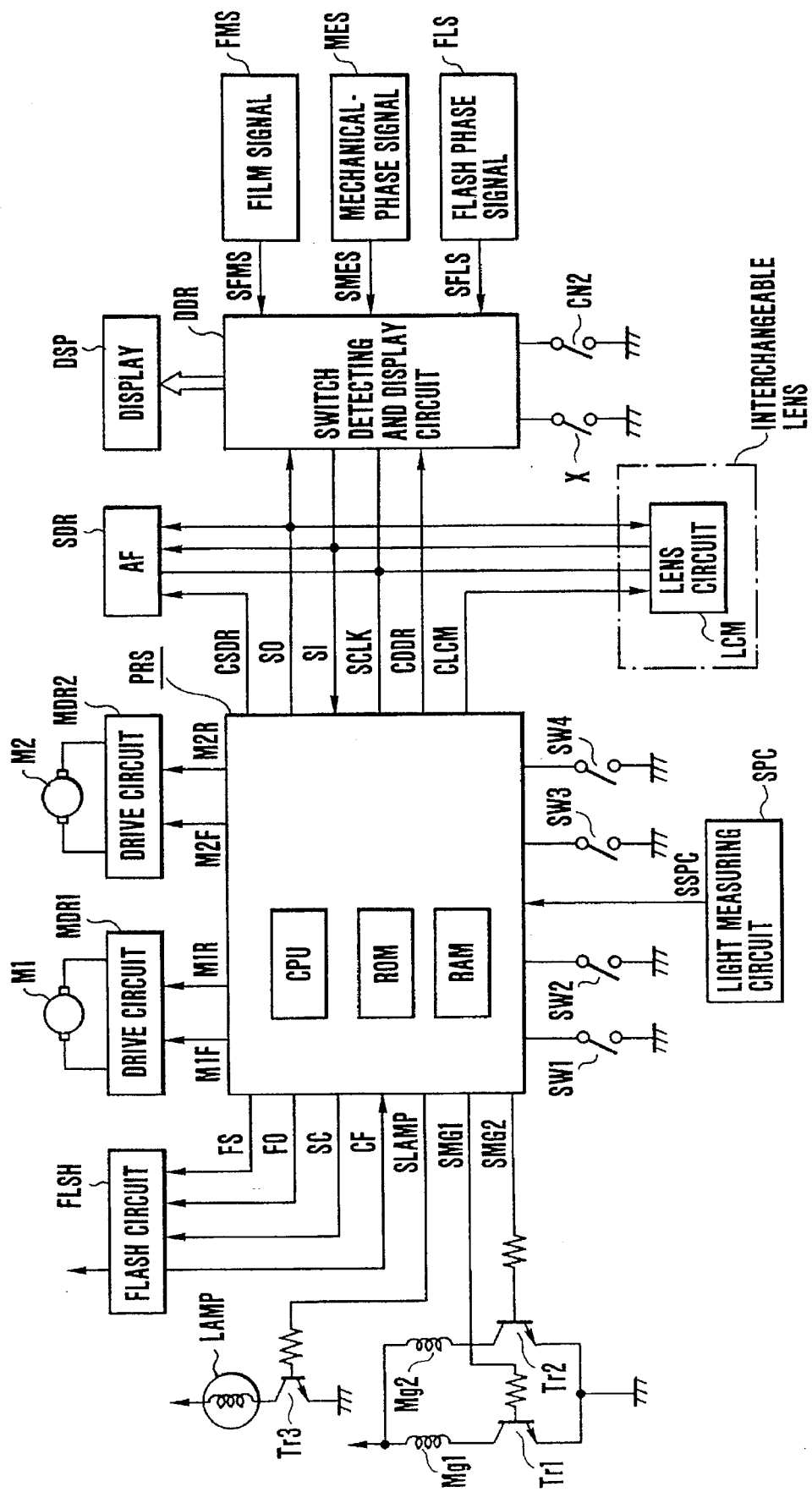
FIG. 7 is a block diagram showing an electronic control system incorporated in the camera.

FIG. 7 is a circuit block diagram showing the above-described embodiment.

A circuit element PRS performs camera control and consists of a one-chip microcomputer (hereinafter referred to as a "microcomputer") including, for example, a CPU (central processing unit), a ROM and a RAM as well as an A/D conversion function. The microcomputer PRS controls a series of operations of the camera such as an automatic exposure control function, an automatic focus detecting function, a flash control function, a film winding function and a mechanism charging function, in accordance with a sequence program for the camera, which is stored in the ROM.

To achieve the aforesaid control, the microcomputer PRS communicates with a lens and peripheral circuits provided in the camera body by using synchronous communication signals SO, SI, and SCLK as well as communication selecting signals CLCM, CSDR, and CDDR, thereby controlling individual circuits and the operation of the lens.

Symbol SO represents a data signal outputted from the microcomputer PRS, symbol SI represents a data signal inputted to the microcomputer PRS, and symbol SCLK represents a sync clock for the signals SO and SI. A lens communication buffer circuit LCM supplies electrical power to a power supply terminal for the lens during the operation of the camera, and serves as a buffer for communication between the camera and the lens when the selecting signal CLCM from the microcomputer PRS is at its high potential level (hereinafter referred to simply as "H level"). More specifically, when the microcomputer PRS sets the selecting signal CLCM to an H level and sends out predetermined data as the signal SO in synchronism with the sync clock SCLK, the buffer circuit LCM outputs buffer signals such as the sync clock SCLK and the signal SO to the lens through camera-to-lens contacts. Similarly, the buffer circuit LCM outputs as the signal SI a signal indicative of a focal length supplied from the lens. The microcomputer PRS receives the signal SI as focal length inform from the lens in synchronism with the sync clock SCLK.

A circuit SDR is a drive circuit for a focus-detecting line sensor made up of a CCD and other associated elements. When the communication selecting signal CSDR is at its H level, the drive circuit SDR is selected and is controlled by the microcomputer PRS by using the signals SO, SI and the clock SCLK.

A light-measuring sensor SPC for exposure control receives light from a subject through a photographic lens. An output SSPC of the light-measuring sensor SPC is applied to an analog input terminal of the microcomputer PRS and, after A/D conversion, is used for automatic exposure control (AE) in accordance with a predetermined program.

A circuit DDR is a circuit for performing switch detection and for providing display, and when the signal CDDR is at its H level, the circuit DDR is selected and is controlled by the microcomputer PRS by using the signals SO, SI and the sync clock SCLK. A circuit FMS is a film-transportation detecting circuit and its detection output is inputted into the circuit DDR as a signal SFMS. A circuit MES is a mechanical-phase detecting circuit for a shutter, a mirror and the like, and its detection output is inputted into the circuit DDR as a signal SMES.

A circuit FLS is a flash-phase detecting circuit, and detects whether the flash unit has popped up or what is the phase of the zooming of the flash unit, and supplies a detection output to the circuit DDR as a signal SFLS. A switch X is turned on when the running of the leading curtain of the shutter is completed, and a switch CN2 is turned on when the running of the trailing curtain of the shutter is completed.

The circuit DDR switches the display contents of a display member DSP of the camera or transmits switch or state signals associated with various states of the camera to the microcomputer PRS by communication, on the basis of data transmitted from the microcomputer PRS.

Switches SW1 and SW2 are switches interlocked with a release button, which is not shown. When the release button is depressed to a first stroke position, the switch SW1 is turned on, and subsequently, when the release button is depressed to a second stroke position, the switch SW2 is turned on. When the switch SW1 is turned on, the microcomputer PRS performs light measurement, automatic focus adjustment, the operation of popping up the flash unit, and red-eye preventing flashing, as will be described later. When the switch SW2 is turned on to generate a trigger signal, the microcomputer PRS performs exposure control, flashing of the flash unit and film winding. A switch SW3 is a switch for detecting the completion of the pop-up operation of the flash unit, and detects the motion of the aforesaid lever 11. A motor M1 is a film transporting motor, and a motor M2 is a motor for realizing mirror-up and mirror-down operations, shutter charging, a pop-up initiating operation of the flash unit, and driving for flash zooming (variation of an illumination angle). The motors M1 and M2 are driven in the forward and reverse directions under control of associated drive circuits MDR1 and MDR2. Signals M1F, M1R, M2F and M2R are inputted from the microcomputer PRS to the drive circuits MDR1 and MDR2 as signals for motor control.

Electromagnets Mg1 and Mg2 are provided for initiating the running of the leading curtain and the trailing curtain of the shutter, respectively. The electromagnets Mg1 and Mg2 are respectively energized by amplifier transistors Tr1 and Tr2 by the application of signals SMG1 and SMG2, whereby the shutter is controlled by the microcomputer PRS.

A lamp LAMP is a red-eye preventing lamp and is energized by an amplifier transistor Tr3 by the application of a signal SLAMP, whereby emission control is provided by the microcomputer PRS.

A circuit FLSH is a flash circuit including a main capacitor and a xenon tube, and is controlled by the microcomputer PRS by means of a flashing signal FS, a flashing stop signal FO, a charging start signal SC and a charging completion signal CF.

A switch SW4 is a switch for indicating whether a red-eye preventing mode is set.

Figure 8:
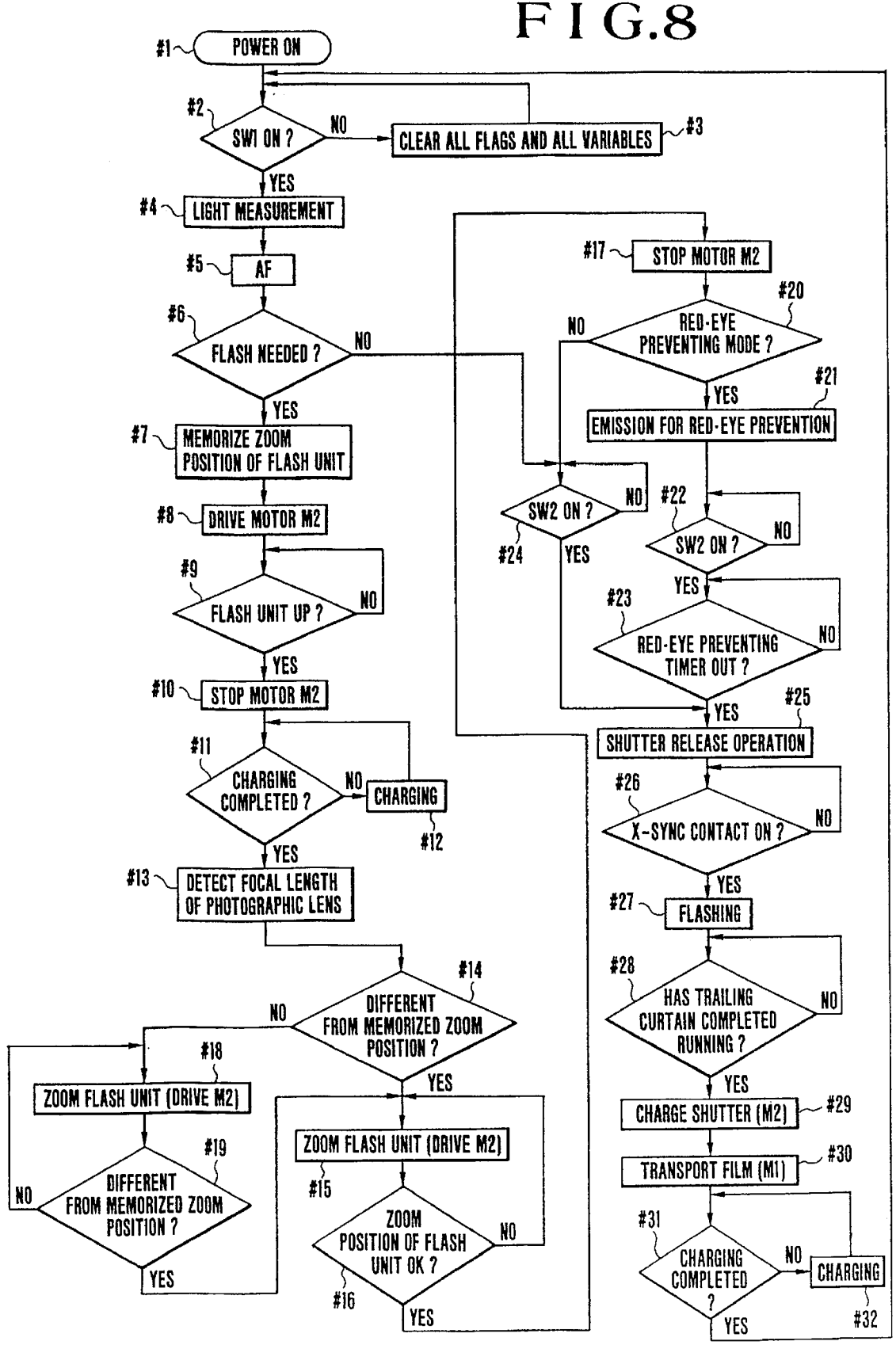
FIG. 8 is a flowchart showing a control operation executed by the microcomputer of FIG. 7 according to a first embodiment.

The operation of the camera having the above-described construction will be described below with reference to the flowchart of FIG. 8. When a power supply switch (not shown) is turned on (Step #1), the supply of electricity to the microcomputer PRS is initiated and the microcomputer PRS initiates execution of a sequence program stored in the ROM. When the execution of the sequence program is initiated by the aforesaid operation, it is detected in Step #2 whether the switch SW1 has been turned on by the depression of the release button SW1 to the first stroke position. If the switch SW1 is off, the process proceeds to Step #3, where all control flags and control variables set in the RAM of the microcomputer PRS are cleared and initialized.

Steps #2 and #3 are repeated until the switch SW1 is turned on or the power supply switch is turned off. When the switch SW1 is turned on, the process proceeds to Step #4. In Step #4, a light measurement subroutine for exposure control is executed. An output SSPC from the light measuring circuit SPC shown in FIG. 7 is inputted into the microcomputer PRS through an analog input terminal thereof, and the microcomputer PRS performs A/D conversion. The microcomputer PRS computes an optimum shutter control value and aperture control value on the basis of the digital light measurement value and determines whether use of the flash unit is needed, and stores the optimum shutter and aperture control values and the decision result into predetermined addresses within the RAM. In Step #5, an AF operation is completed, and if it is determined in Step #6 that the flash unit is needed, the operation of setting the flash unit to a usable condition is started. Also, during a release operation, control of the shutter and the diaphragm is performed on the basis of the aforesaid values. If it is determined in Step #6 that the flash unit is not needed, the process proceeds to Step #24, where the process waits for the switch SW2 to be turned on by a release operation. If it is determined in Step #6 that the flash unit is needed, the process proceeds to Step #7, where the zoom position of the flash unit before it is popped up is memorized as a flash zoom position signal on the basis of the signal SFLS from the flash-phase detecting circuit FLS. Then, in Step #8, the motor M2 is reversed, and the gears 6 to 10 are made to rotate to release the retention provided by the retaining lever 12, thereby causing the flash unit to pop up.

Then, the process proceeds to Step #9, where it is detected whether the flash unit has been popped up by detecting whether the switch SW3 has been turned on. If the completion of the pop-up operation is detected, the motor M2 is temporarily stopped in Step #10. In Step #11, it is determined whether the charging of the flash unit has been completed. If the flash unit has not yet been completely charged, the process proceeds to Step #12, where the microcomputer PRS outputs the charging-of-flash-unit start signal SC to start the charging of the flash unit. If the charging is completed, the charging completion signal CF is generated, and the process proceeds to Step #13. In Step #13, the microcomputer PRS receives information on the present focal length of the photographic lens via the lens communication buffer circuit LCM. In Step #14, the flash zoom position signal memorized in Step #7 is compared with a flash zoom position signal corresponding to the focal length detected in Step #13. If these flash zoom position signals differ from each other, the process proceeds to Step #15, where the motor M2 is reversed. If it is determined in Step #14 that the flash zoom position signal memorized in Step #7 coincides with the flash zoom position signal indicative of the focal length detected in Step #13 as a result of the reversing of the motor M2, the process proceeds to Step #18, where the motor M2 is reversed to perform driving for flash zooming. If it is determined in Step #19 that the flash unit has been moved to a position different from the flash zoom position memorized in Step #7, the process returns to Step

15, where the flash unit is moved to a flash zoom position corresponding to the focal length of the photographic lens detected in Step #13.

In other words, if the pop-up operation is completed by reversing the motor M2 to a slight extent, there is a case where the flash zoom position does not substantially change and the flash unit stops at a position immediately before a position where the cam 21a is displaced to the succeeding cam phase which allows the flash unit to zoom toward the succeeding illumination angle. In the ordinary design of a flash zooming stop control, the stop range of flash zooming is determined by taking account of the influence of the dynamic characteristics of a driving system which remains after the signal from the printed board 32 has switched to a different brake phase. However, in such a design, since a flash zooming mechanism remains driven when the pop-up operation is completed, the flash zooming stop control does not work correctly. For this reason, in the above-described embodiment, if no photographic lens is attached to the camera body, the flash zooming mechanism is driven so that the flash unit moves to and stops at a flash zoom position following the flash zoom position where the flash unit was placed immediately before the pop-up operation.

Since the flash unit has been popped up, a retention release mechanism withdraws into a non-engagement position and continues idling. Since the projection 11b of the lever 11 is away from the rotating area of the blade assembly 10a, only a flash zooming mechanism is driven (the transmission lever 22 is made to swing by the motion of the cam 21a, thereby moving the holder 27). A signal from the flash-zooming detecting printed board 32 is transmitted to the microcomputer PRS via the flash-phase detecting circuit FLS. If it is determined in Step #16 that the flash unit reaches the position of an illumination angle corresponding to the focal length of the photographic lens detected in Step #13, the process proceeds to Step #17, where the motor M2 is reversed.

The detecting printed board 32 has a pattern corresponding to focal length (cam phase), and the state of zooming of the flash unit is detected by causing the contact piece 31 to slide on the pattern.

The process proceeds to Step #20, where the state of the switch SW4 is identified to determine whether the red-eye preventing mode has been set. If it is determined that the red-eye preventing mode has not been set, the process proceeds to Step #24; otherwise, the process proceeds to Step #21.

If the red-eye preventing mode has been set, the lamp LAMP (red-eye preventing lamp 33) is lit up when the signal SLAMP of the microcomputer PRS of FIG. 7 is at the H level, and illuminates a subject to reduce the pupils thereof, thereby preventing a red-eye phenomenon. Then, the process proceeds to Step #22, where it is detected whether the switch SW2 has been turned on by the depression of the release button to the second stroke position. If the switch SW2 is off, the process waits for the switch SW2 to be turned on in Step #22. If the switch SW2 is on, the process proceeds to Step #23. It is determined in Step #23 whether the time period required to reduce the pupils has elapsed. If such required time period has not yet elapsed, the lamp LAMP continues to be lit up. If the required time period elapses, the process proceeds to Step #25. If it is determined in Step #6 that the flashing of the flash unit is not needed, the process proceeds to Step #24, where it is determined whether the switch SW2 has been turned on. If it is determined in Step #20 that the red-eye preventing mode has not been set, the process similarly proceeds to Step #24, where it is determined whether the switch SW2 has been turned on. If the switch SW2 is turned on, the process proceeds to Step #25, where a shutter release operation is started. More specifically, the motor M2 is driven forward in accordance with the signal M2F from the microcomputer PRS, and meshes the planetary gear 55 with the mirror driving gear 56 to perform a mirror-up operation. When the mirror-up operation is completed, the signal SI is sent to the microcomputer PRS through the mechanical-phase detecting circuit MES and the motor M2 is made to stop. Then, the leading curtain electromagnet Mg1 of the shutter is energized in accordance with the signal SMG1 from the microcomputer PRS, and the shutter leading curtain is made to run by the force of a spring which is not shown, thereby causing film to be exposed. Subsequently, the signal SMG2 is generated after a predetermined time delay based on the shutter speed computed in Step #4, and the trailing curtain electromagnet Mg2 of the shutter is energized to cause the shutter trailing curtain to run. If the flash unit is not needed, the shutter speed is set to a flash sync speed. If the flash unit is needed, the process proceeds to Step #26, where a decision is made as to the state of an X-sync contact which is turned on when the shutter leading curtain completes running. If the X-sync contact is turned on, the signal is sent to the microcomputer PRS through the circuit DDR and, in Step #27, the flash unit is made to flash (the xenon tube 25 is made to flash). If the flash unit is not needed, it does not flash. If the flash unit flashes, the flashing stop signal FO is generated on the basis of the output of a flashing control circuit which is not shown, and the flashing of the flash unit is stopped. Then, the process proceeds to Step #28, where it is determined whether the running of the shutter trailing curtain has been completed. If the running of the shutter trailing curtain has been completed, the switch CN2 is turned on and a corresponding signal is transmitted to the microcomputer PRS through the circuit DDR. The process proceeds to Step #29. In Step #29, the motor M2 is driven forward on the basis of the signal M2F to perform a mirror-down operation and a shutter charging operation. If the mirror-down operation and the shutter charging operation have been completed, a corresponding signal is transmitted to the microcomputer PRS through the mechanical-phase detecting circuit MES and the forward rotation of the motor M2 is stopped. Then, the process proceeds to Step #30, where film transportation is performed. The motor M1 is driven forward on the basis of the signal M1F from the microcomputer PRS, thereby causing the film to be wound.

When the film is wound by one frame, a corresponding signal is transmitted to the microcomputer PRS through the film-transportation detecting circuit FMS, and the forward running of the motor M1 is stopped.

Incidentally, the motor M1 is arranged to be reversed on the basis of the signal M1R, causing the film to be rewound. The operations of Steps #29 and #30 need not necessarily be performed in series and may also be performed at the same time.

When the shutter charging and the film transportation have been completed, the process proceeds to Step #31, where it is determined whether the flash unit has been charged. If the flash unit is not completely charged, the process proceeds to Step #32, where charging of the flash unit is performed in preparation for the next photographic cycle.

The above-described first embodiment has the following features. The motor serving as a drive source for the illumination-angle varying mechanism (flash zooming mechanism) of the flash unit is incorporated into the camera body, and the motor is not used exclusively for the zooming of the flash unit and is also be used for driving other camera operation mechanisms such as a mirror or a shutter. Accordingly, it is possible to achieve a zoom flash unit without increasing the size of a camera itself. In addition, it is possible to achieve reductions in the size and weight of a flash unit. The transmission of the output of the motor to both mechanisms is effected through the planetary clutch mechanism which switches transmission paths therebetween in accordance with the switching of the rotating direction of the motor (motor M2), so that both mechanisms can be driven selectively and independently. Accordingly, it is possible to prevent either of the mechanisms from adversely affecting a camera operation when the flash unit use or when a flash zooming operation with no shutter release operation is performed.

Figure 12:
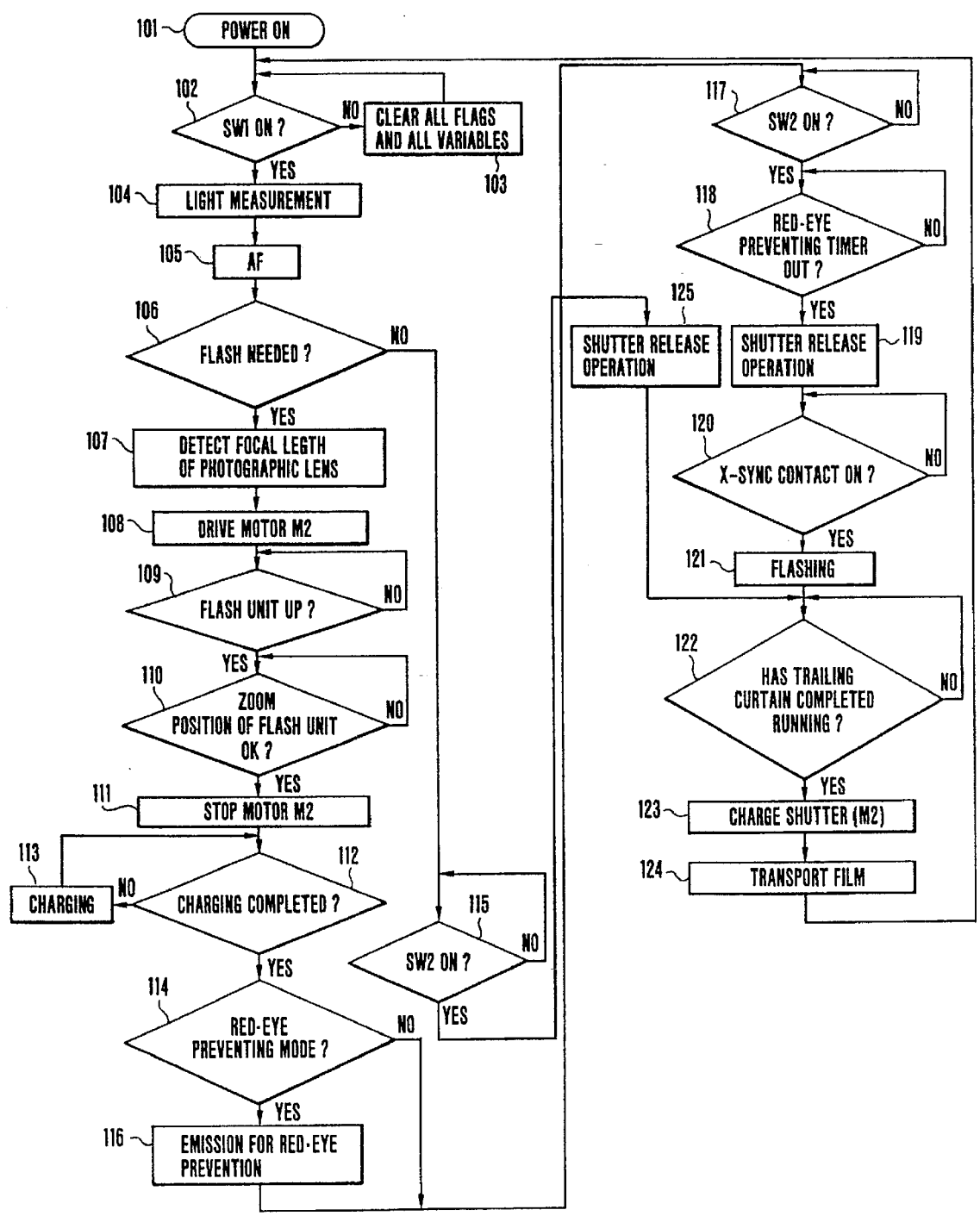
FIG. 12 is a flowchart showing a control operation executed by the microcomputer of FIG. 7 according to a second embodiment.

A second embodiment will be described below with reference to the flowchart of FIG. 12. When the power supply switch (not shown) is turned on (Step 101), the supply of electricity to the microcomputer PRS is initiated and the microcomputer PRS initiates execution of a sequence program stored in the ROM. When the execution of the sequence program is initiated by the aforesaid operation, it is detected in Step 102 whether the switch SW1 has been turned on by the depression of the release button SW1 to the first stroke position. If the switch SW1 is off, the process proceeds to Step 103, where all control flags and control variables set in the RAM of the microcomputer PRS are cleared and initialized.

Steps 102 and 103 are repeated until the switch SW1 is turned on. When the switch SW1 is turned on, the process proceeds to Step 104. In Step 104, a light measurement subroutine for exposure control is executed. The output SSPC from the light measuring circuit SPC shown in FIG. 7 is inputted into the microcomputer PRS through the analog input terminal thereof, and the microcomputer PRS performs A/D conversion. The microcomputer PRS computes an optimum shutter control value and aperture control value on the basis of the digital light measurement value and determines whether use of the flash unit is needed, and stores the optimum shutter and aperture control values and the decision result into predetermined addresses within the RAM. In Step 105, an AF operation is completed.

If it is determined in Step 106 that the flash unit is needed, the process proceeds to Step 107, where the focal length of an attached photographic lens is introduced from the lens communication buffer circuit LCM and is memorized in the RAM of the microcomputer PRS.

If it is determined in Step 106 that the flash unit is not needed, the process proceeds to Step 115, where the process waits for a shutter release operation to be performed.

Then, in Step 108, the motor M2 is reversed, and the gears 6 to 8 are made to rotate to release the retention provided by the retaining lever 12, thereby causing the flash unit to pop up. At the same time, the gears 9 and 18 to 21 are made to rotate to swing the transmission lever 22, thereby moving the holder 27, the xenon tube 25, the reflector 26 and the associated elements to start changing the illumination angle.

Then, the process proceeds to Step 109, where it is detected whether the flash unit has been popped up by detecting whether the switch SW3 has been turned on. If the completion of the pop-up operation is detected, the process proceeds to Step 110.

In Step 110, it is determined whether the focal length of the photographic lens detected in Step 107 correctly corresponds to the illumination angle of the flash unit. If it is determined that a correct correspondence has been established, the process proceeds to Step 111, where the reversing of the motor M2 is stopped.

In other words, as described above, the operation of popping up the flash unit and the operation of changing the illumination angle are simultaneously initiated by reversing the motor M2, and if it is detected that both operations have been completed, the reversing of the motor M2 is stopped.

When the detecting printed board 32 has the pattern corresponding to focal length (cam phase), the state of zooming of the flash unit is detected by causing the contact piece 31 to slide on the pattern.

In Step 112, it is determined whether the charging of the flash unit has been completed. If the flash unit has not yet been completely charged, the process proceeds to Step 113, where the microcomputer PRS outputs the charging-of-flash-unit start signal SC to start the charging of the flash unit. If the charging is completed, the charging completion signal CF is generated, and the process proceeds to Step 114.

In Step 114, the state of the switch SW4 is identified to determine whether the red-eye preventing mode has been set. If it is determined that the red-eye preventing mode has not been set, the process proceeds to Step 117; otherwise, the process proceeds to Step 116.

If the red-eye preventing mode has been set, the lamp LAMP (red-eye preventing lamp 33) is lit up when the signal SLAMP of the microcomputer PRS of FIG. 7 is at the H level, and illuminates a subject to reduce the pupils thereof, thereby preventing a red-eye phenomenon. Then, the process proceeds to Step 117, where it is detected whether the switch SW2 has been turned on by the depression of the release button to the second stroke position. If the switch SW2 is off, the process waits for the switch SW2 to be turned on in Step 117.

If the switch SW2 is on, the process proceeds to Step 118. It is determined in Step 118 whether the time period required to reduce the pupils has elapsed. If it is determined in Step 114 that the red-eye preventing mode has not been set, the elapsed time of a timer is "zero", the process immediately proceeds to Step 119. If such required time period has not yet elapsed, the lamp LAMP continues to be lit up until the required time period elapses. If the required time period elapses, the process proceeds to Step 119.

If it is determined in Step 106 that the flashing of the flash unit is not needed, the process proceeds to Step 115, where it is determined whether the switch SW2 has been turned on. If it is determined in Step 115 that the switch SW2 is turned on, the process proceeds to Step 125, where a shutter release operation is started. More specifically, the motor M2 is driven forward in accordance with the signal M2F from the microcomputer PRS, and meshes the planetary gear 55 with the mirror driving gear 56 to perform a mirror-up operation. When the mirror-up operation is completed, the signal SI is sent to the microcomputer PRS through the input-phase detecting circuit MES and the motor M2 is made to stop. Then, the leading curtain electromagnet Mg1 of the shutter is energized in accordance with the signal SMG1 from the microcomputer PRS, and the shutter leading curtain is made to run by the force of a spring which is not shown, thereby causing film to be exposed. Subsequently, the signal SMG2 is generated after a predetermined time delay based on the shutter speed computed in Step 104, and the trailing curtain electromagnet Mg2 of the shutter is energized to cause the shutter trailing curtain to run. If the flash unit is not needed, the shutter speed is set to a flash sync speed. If the flash unit is needed, the process proceeds to Step 119, where the motor M2 is driven forward to perform a mirror-up operation and the leading curtain electromagnet Mg1 of the shutter is energized to cause the shutter leading curtain to run. Then, the process proceeds to Step 120, where a decision is made as to the state of the X-sync contact which is turned on when the shutter leading curtain completes running. If the X-sync contact is turned on, the signal is sent to the microcomputer PRS through the circuit DDR and, in Step 121, the flash unit is made to flash (the xenon tube 25 is made to flash). If the flash unit flashes, the flashing stop signal FO is generated on the basis of the output of a flashing control circuit which is not shown, and the flashing of the flash unit is stopped. Then, the process proceeds to Step 122, where it is determined whether the running of the shutter trailing curtain has been completed. If the running of the shutter trailing curtain has been completed, the switch CN2 is turned on and a corresponding signal is transmitted to the microcomputer PRS through the circuit DDR. The process proceeds to Step 123. In Step 123, the motor M2 is driven forward on the basis of the signal M2F to perform a mirror-down operation and a shutter charging operation. If the mirror-down operation and the shutter charging operation have been completed, a corresponding signal is transmitted to the microcomputer PRS through the mechanical-phase detecting circuit MES and the forward rotation of the motor M2 is stopped. Then, the process proceeds to Step 124, where film transportation is performed. The motor M1 is driven forward on the basis of the signal M1F from the microcomputer PRS, thereby causing the film to be wound.

When the film is wound by one frame, a corresponding signal is transmitted to the microcomputer PRS through the film-transportation detecting circuit FMS, and the forward running of the motor M1 is stopped. Incidentally, the motor M1 is arranged to be reversed on the basis of the signal M1R, causing the film to be rewound. The operations of Steps 123 and 124 need not necessarily be performed in series and may also be performed at the same time.

Although each of the first and second embodiments has been described with reference to the flash unit of the type which is built in a camera body, the present invention can also be applied to a flash unit of the type which is removably attachable to a camera body.

Although each of the first and second embodiments employs only gears for the transmission system, a belt drive mechanism may also be partly employed.

In addition, according to the first embodiment, in a camera which includes as a built-in unit, or to which is removably attachable, a flash unit having an illumination-angle varying mechanism in its interior, the rotation in one direction of the motor for driving camera operation mechanisms such as a mirror and a shutter charging mechanism within the camera body is utilized to operate the illumination-angle varying mechanism and the retention release mechanism for retaining the flash unit in a pop-up position. In addition, since the phases of operations of both mechanisms are made coincident, it is possible to prevent either of the mechanisms from hindering the operation of popping down the flash unit. Accordingly, it is possible to achieve a compact, low-cost and light-weight flash unit which can operate accurately.

According to the second embodiment, since the operation of popping up the flash unit and the operation of changing the illumination angle are simultaneously initiated, it is possible to reduce a release time lag to a great extent compared to conventional mechanisms. Accordingly, it is possible to provide a camera which includes as a built-in unit, or to which is removably attachable, a flash unit which can rapidly respond to a shutter opportunity.

What is claimed is:

1. A camera including a camera body and a flash unit, said camera comprising:

(a) a drive source disposed in said camera body;

(b) a moving mechanism for causing said flash unit to move from a non-projected position to a projected position;

(c) an illumination-angle switching mechanism including a cam member for varying an illumination angle of said flash unit, said cam member being driven by a force provided by said drive source in one direction, said cam member including a first cam surface which when driven by said drive source moves at least one part of said flash unit to thereby vary the illumination angle of said flash unit, and a second cam surface continuously formed with said first cam surface, said second cam surface being different from said first cam surface and which, when driven by said drive source, does not move said at least one part of said flash unit;

(d) focal-length detecting means for detecting a focal length of lens means; and (e) controlling means for causing said illumination-angle switching mechanism to selectively switch one illumination angle to another in accordance with the focal length detected by said focal-length detecting means, in response to the operation of said moving mechanism to move said flash unit from said non-projected position to said projected position by the force in said one direction.

2. A camera according to claim 1, further comprising an engagement mechanism capable of assuming an engaged state which causes said flash unit to be held in said non-projected position, and switchable from said engaged state to a non-engaged state by being driven by said drive source.

3. A camera according to claim 2, wherein said drive source is a motor, said engagement mechanism switching from said engaged state to said non-engaged state at substantially the same time that said illumination-angle switching mechanism selectively switches said illumination angles therebetween, by means of a rotation of said motor in one direction.

4. A camera according to claim 3, wherein said illumination-angle switching mechanism has means for detecting said plurality of specific illumination angle states, said illumination-angle switching mechanism being stopped in any one of said plurality of specific illumination angle states on the basis of an output of said focal-length detecting means and a selected illumination angle state.

5. A camera according to claim 4, wherein a rotation of said motor in another direction is utilized as a drive source for a camera operation mechanism disposed in a camera.

6. A camera according to claim 3, further comprising a camera operation mechanism, wherein a rotation of said motor in another direction is utilized as a drive source for said camera operation mechanism disposed in a camera body.

7. A camera according to claim 6, wherein the rotation of said motor in said one direction is started in accordance with a turn-off operation of a switch for starting an operation of light measuring means.

8. A camera according to claim 7, wherein the rotation of said motor in said other direction is performed in accordance with a turn-on operation of a switch for starting an operation for initiating an exposure operation, said camera operation mechanism performing an operation preceding an actual exposure.

9. A camera according to claim 3, wherein said illumination-angle switching mechanism comprises signal output means for outputting a signal to control a supply of electricity to said motor, said signal output means outputting a signal to cause said cam member to stop at said second cam surface.

10. A camera according to claim 9, wherein said signal output means outputs a signal for controlling a supply of electricity to said motor in a range smaller than that for the second cam surface of said cam member.

11. A camera according to claim 9, wherein said signal output means comprises a contact piece disposed on said cam member and a printed board which is capable of making contact with said contact piece, said signal being outputted when said contact piece contacts a predetermined pattern of said printed board.

12. A camera according to claim 1, wherein said flash unit is built into said camera body.

13. A camera according to claim 1, wherein said illumination-angle switching mechanism comprises signal output means for outputting a drive signal to perform a drive control of said drive source, said signal output means outputting said drive signal at a timing at which the first cam surface of said cam member is acting which is different from a timing at which the second cam surface is acting.

* * * * *

UNITED STATES PATENT AND TRADEMARK OFFICE
CERTIFICATE OF CORRECTION

PATENT NO : 5,652,920
DATED : July 29, 1997
INVENTOR(S) : SHOJI KAIHARA, ET AL It is certified that error appears in the above-identified patent and that said Letters Patent is hereby corrected as shown below <u>Column 6</u>

Line 51, "as" should read --as lens-- and "inform" should read --information--

Signed and Sealed this

Third Day of February, 1998

BRUCE LEHMAN

*Attest:*

*Attesting Officer*   *Commissioner of Patents and Trademarks*